Jan. 1, 1935. J. R. JAHN 1,985,899
PIPE SLIP JOINT
Filed Aug. 3, 1932

INVENTOR
John R. Jahn
BY
Booth & Booth
ATTORNEYS

Patented Jan. 1, 1935

1,985,899

UNITED STATES PATENT OFFICE 1,985,899

PIPE SLIP JOINT

John R. Jahn, Berkeley, Calif., assignor to California Corrugated Culvert Co., Berkeley, Calif., a corporation of California Application August 3, 1932, Serial No. 627,327

2 Claims. (Cl. 285—163)

The present invention relates to quick-detachable or slip joints for pipe, and is especially suitable for joining the sections of movable pipe used for irrigation.

The objects of the invention are to provide a simple and inexpensive joint which is easily and quickly assembled and taken apart, which is automatically progressively tightened by increasing fluid pressure, which permits some angularity between pipe sections, which offers practically no resistance to the flow of water through the pipe, and in which the only part subject to wear is a cheap and easily replaced gasket. A further object is to provide a joint which can be applied as an attachment to plain or straight ended cylindrical pipes or tubes to adapt them for quick coupling into a continuous pressure tight fluid conduit. These and other objects and advantages of the invention will be apparent from the following specification, which should be read with the understanding that changes, within the scope of the appended claims, may be made in the form, construction and arrangement of the several parts, without departing from the spirit of the invention.

In certain forms of irrigation practice, it is customary to use a long line of pipe, lying upon the surface of the ground, and having a plurality of suitably spaced water outlets. When the area reached by said outlets has been sufficiently irrigated, the entire pipe line is shifted to a new location. This necessitates separating the joints of the line, moving the sections separately, and re-assembling them in the new location. My improved slip joint is well adapted for this use, and results in considerable saving, both in first cost of the pipe and in the labor required to move it. My joint, however, is not limited to such use, but may be employed in any situation and for any purpose for which its construction renders it suitable.

Figure 1:
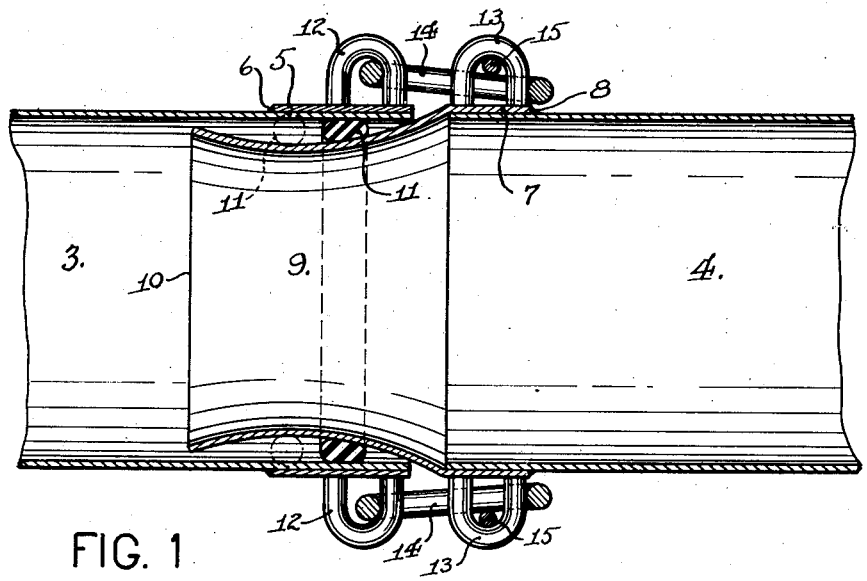

Reference will be made to the accompanying drawing, which illustrates a preferred embodiment of the invention, and in which Fig. 1 is a longitudinal section of my improved joint, taken on the line 1—1 of Fig. 2.

Figure 2:
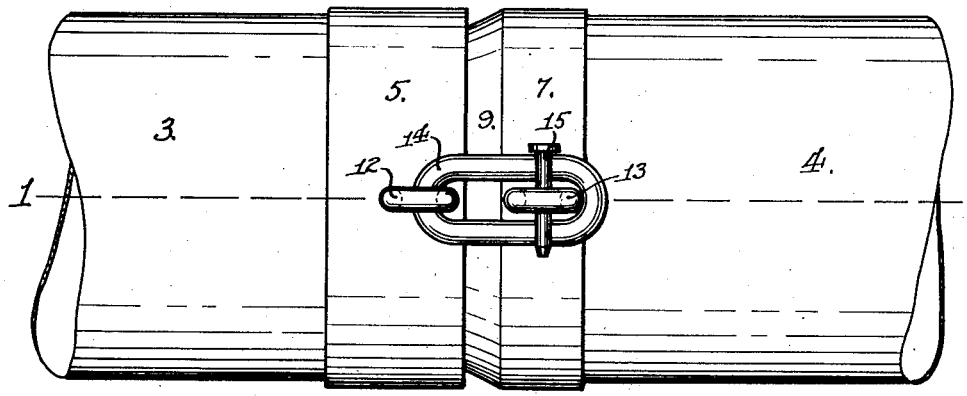

Fig. 2 is an elevation of the same.

In the drawing, the reference numerals 3 and 4 designate two sections of pipe to be joined. A cylindrical reinforcing collar 5 is permanently secured, preferably by welding as indicated at 6, exteriorly upon the end of the section 3. A sleeve member 7 is similarly secured, as by welding at 8, upon the end of the section 4. The sleeve member 7, unlike the collar 5, does not terminate at the end of the pipe, but is extended to form a joint member 9, having a throat portion which in longitudinal section is smoothly arched inwardly, terminating in a flared free end 10. The outside diameter of the extension or joint member 9 is such as to permit it to enter freely, for the greater portion of its length, into the end of the pipe section 3, and the diameter of its free end 10, although greater than that of its central region, is preferably sufficiently less than the inside diameter of the section 3 to permit a few degrees of angularity between the axes of the two sections.

A resilient ring gasket 11, preferably rubber, of circular or oval cross section, is adapted to rest upon the constricted throat portion or continuously curved wedging surface constituting the outer periphery of the extension 9 before the two pipe sections are assembled, occupying a position as indicated in dotted lines in Fig. 1. It should be noted that the outside or greater diameter of the gasket is equal to or greater than the inside diameter of the straight cylindrical pipe section 3 and that the telescoping of the adjacent ends, 9 into 3, causes the gasket to be rolled under the outer edge of section 3 and up and upon the expanded portion or wedging surface of section 9, to the position shown in full lines, thereby wedging tightly between the surfaces of said sections.

Any suitable means are provided for holding the two sections together, such as U-shaped bails or lugs 12 and 13 secured respectively to the collar 5 and sleeve 7, and freely swinging links 14 permanently engaging the lugs 12 and adapted to be slipped over the lugs 13. Removable pins 15 may be passed through the lugs 13 to lock the links 14 in position, as shown.

It will be seen that my joint may be assembled and made water tight simply by pushing the end of one pipe section into the end of the other and locking the links 14, and that it may be taken apart by reversing the process. The shape of the extension 9, with its smoothly arched central portion or throat of reduced diameter and its flaring ends, not only tightens the joint by wedging the ring gasket when the pipe sections are pushed together, and causes said gasket to be progressively wedged tighter as the fluid pressure in the pipe is increased, but retains the ring gasket upon the extension when the joint is taken apart, so that said gasket need not be handled separately and is not likely to be lost. Attention is especially directed to the fact that, although the throat portion 9 is constricted to a diameter materially less than that of the straight pipe sections 3 and 4, nevertheless its smoothly arched form produces a Venturi effect which offers practically no obstruction or resistance to the flow of water through the pipe.

The joint is simple and inexpensive to construct, has no parts subject to wear except the cheap and easily replaced ring gasket, and can be easily cleaned merely by washing or even wiping off. This latter is of particular advantage in irrigation work, when the pipe sections are laid upon loose earth. Furthermore, the joint permits some angularity between sections of the pipe line to allow it to conform to irregularities in the ground surface, and such angularity does not impair its tightness.

Obviously, the extension 9 may be integral with the pipe section 4, instead of being a separate member secured thereto, as shown. The joint, therefore, lends itself admirably to coupling together sections of the well known circumferentially corrugated pipe, in which the last or end corrugation forms a seat for the gasket.

On the other hand, my joint is also well adapted for use with plain cylindrical pipe sections of uniform diameter, it being necessary only to attach the collar 5 and sleeve 7 to the respective ends of such pipe sections to enable them to be joined together, detachably, into a continuous conduit. In other words, the end portions of the pipe sections need not be specially formed, and one of said end portions, viz:—that of the section 3, becomes one member of the joint itself.

I claim:—

1. A pipe joint comprising inner and outer telescoping pipe sections, the insertable end of one section having oppositely extending gradually inclined wedging surfaces of substantial length, one of said surfaces terminating in an extremity of less diameter than the internal diameter of the radially spaced portion of the outer pipe section to permit of relative angular movement of said pipe sections, and an axially movable resilient ring gasket carried by said wedging surface and at all times in contact therewith for engagement with the inner surface of the outer of said pipe sections, the inclination of said wedging surface insuring against displacement of said gasket out of a plane perpendicular to the axis of the pipe section and permitting axial frictional rolling movement of said gasket along the wedging surface for sealing contact with the outer pipe section in any position of the gasket on said wedging surface.

2. A pipe joint comprising inner and outer telescoping pipe sections, the insertable end of one section having a uniform continuous curvature longitudinally of its length to provide an uninterrupted wedging surface of varying diameters and having a less diameter at its extremity than the internal diameter of the radially spaced portion of the outer pipe section to permit of relative angular movement of said pipe sections, and an axially movable resilient ring gasket carried by said wedging surface and engageable with the inner surface of the outer of said pipe sections, the uniform longitudinal curvature of said wedging surface insuring against displacement of said gasket out of a plane perpendicular to the axis of the pipe section and permitting axial frictional rolling movement of said gasket along the wedging surface for uniform sealing contact with the outer pipe section in any position of the gasket on said wedging surface.

JOHN R. JAHN.